United States Patent [19]

Aüerbach

[11] Patent Number: 4,518,391

[45] Date of Patent: May 21, 1985

[54] MONOAZO COMPOUNDS HAVING A SULFO GROUP-CONTAINING DIAZO COMPONENT RADICAL AND A 6-(2'-CHLORO-1',3',5'-TRIAZIN-6'-YLAMINO)-1-HYDROXY-3-SULFONAPHTHALENE COUPLING COMPONENT RADICAL HAVING A SUBSTITUTED AMINO GROUP IN THE 4'-POSITION

[75] Inventor: Guenther Aüerbach, Basel, Switzerland

[73] Assignee: Sandoz Ltd., Basel, Switzerland

[21] Appl. No.: 530,941

[22] Filed: Sep. 12, 1983

[30] Foreign Application Priority Data

Sep. 17, 1982 [DE] Fed. Rep. of Germany ....... 3234505

[51] Int. Cl.³ .................... C09B 62/08; C09B 29/30; D06P 1/38; D06P 3/66
[52] U.S. Cl. .......................... 8/549; 8/437; 8/684; 8/688; 8/917; 8/918; 8/924; 534/632
[58] Field of Search .................. 260/153, 200; 8/549, 8/684

[56] References Cited

U.S. PATENT DOCUMENTS

| | | | |
|---|---|---|---|
| 2,873,269 | 2/1959 | Fasciati et al. | 260/153 |
| 3,546,201 | 12/1970 | Bertin et al. | 260/146 |
| 4,089,895 | 5/1978 | Jager | 260/509 |
| 4,284,554 | 8/1981 | Doswald | 260/153 |
| 4,294,580 | 10/1981 | Henk et al. | 8/549 |

FOREIGN PATENT DOCUMENTS

| | | |
|---|---|---|
| 53750 | 6/1982 | European Pat. Off. |
| 49-104923 | 10/1974 | Japan |
| 78485 | 6/1979 | Luxembourg |
| 636895 | 6/1983 | Switzerland |
| 899376 | 6/1962 | United Kingdom |
| 2003910 | 3/1979 | United Kingdom |
| 2003911 | 3/1979 | United Kingdom |
| 1549820 | 8/1979 | United Kingdom |
| 1551586 | 8/1979 | United Kingdom |
| 1566814 | 5/1980 | United Kingdom |
| 1569246 | 6/1980 | United Kingdom |

Primary Examiner—A. Lionel Clingman
Attorney, Agent, or Firm—Gerald D. Sharkin; Richard E. Vila; Melvyn M. Kassenoff

[57] ABSTRACT

Compounds of the formula

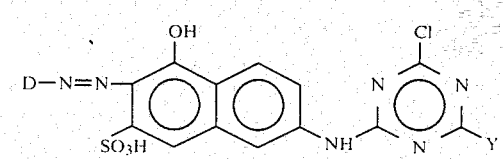

wherein D is

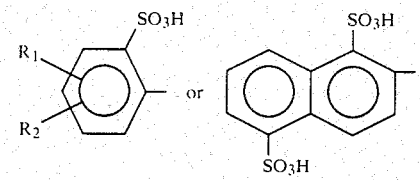

wherein
$R_1$ is H or $SO_3H$, and
$R_2$ is H, halo, $CH_3$, $OCH_3$ or —$NHCOCH_3$, and
Y is

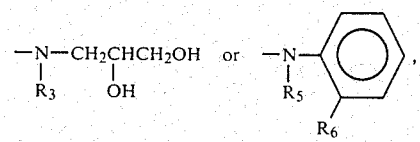

wherein
$R_3$ is H or

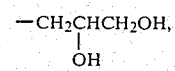

$R_5$ is $C_{1-4}$alkyl or monosubstituted by chloro, cyano or hydroxy, $C_{1-4}$alkyl, and
$R_6$ is halo, $C_{1-4}$alkyl or $C_{1-4}$alkoxy, and mixtures of such compounds, which compounds are in free acid or salt form, are useful for dyeing or printing hydroxy group- or nitrogen-containing organic substrates, particularly leather and textiles containing or consisting of natural or synthetic polyamides or of natural or regenerated cellulose, especially textile materials containing or consisting of cotton.

20 Claims, No Drawings

MONOAZO COMPOUNDS HAVING A SULFO GROUP-CONTAINING DIAZO COMPONENT RADICAL AND A 6-(2'-CHLORO-1',3',5'-TRIAZIN-6'-YLAMINO)-1-HYDROXY-3-SULFONAPHTHALENE COUPLING COMPONENT RADICAL HAVING A SUBSTITUTED AMINO GROUP IN THE 4'-POSITION

The present invention relates to monoazo compounds containing a monochlorotriazinyl group, their preparation and use as fibre reactive dyestuffs.

More particularly, this invention provides compounds which, in the free acid form, correspond to formula I,

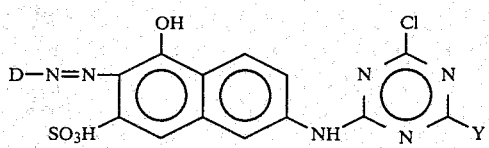

wherein
D is a radical of formula (a) or (b),

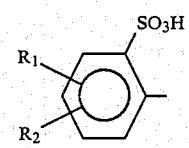

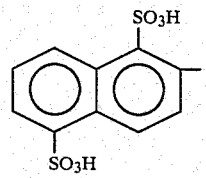

$R_1$ is hydrogen or sulpho,
$R_2$ is hydrogen, halogen, methyl, methoxy or acetamido,
Y is a group $-NR_3R_4$ or a radical of formula (c),

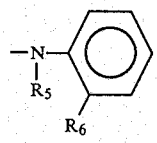

$R_3$ is hydrogen or

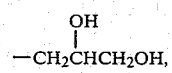

$R_4$ is

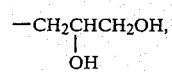

$R_5$ is $C_{1-4}$alkyl or $C_{1-4}$alkyl monosubstituted by chloro, cyano or hydroxy, and
$R_6$ is halogen, $C_{1-4}$alkyl or $C_{1-4}$alkoxy, and mixtures of such compounds, which compounds are in free acid or salt form.

Any halogen as phenyl substituent $R_2$ or $R_6$ is preferably fluorine, chlorine or bromine, especially chlorine.

$R_2$ is preferably $R_{2a}$, where $R_{2a}$ is hydrogen, chlorine, methyl, methoxy or acetamido. More preferably, it is $R_{2b}$, where $R_{2b}$ is hydrogen, methyl or methoxy; most preferably, $R_2$ is methoxy.

The radical (a) is preferably (a$_1$) of the formula

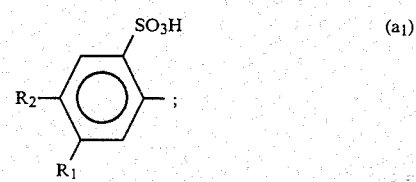

more preferably, it is (a$_2$) of the formula

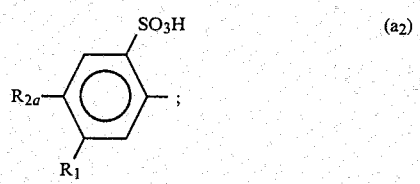

more preferably, it is (a$_3$), where (a$_3$) is a radical (a$_2$) in which $R_{2a}$ is $R_{2b}$; even more preferably, it is (a$_4$) of the formula

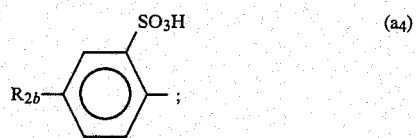

especially, the radical (a) is (a$_5$) of the formula

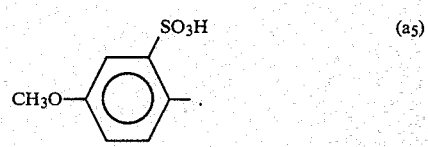

D is preferably $D_1$, where $D_1$ is a radical (a$_1$) or (b); more preferably, it is $D_2$, where $D_2$ is a radical (a$_2$) or (b); more preferably, it is $D_3$, where $D_3$ is a radical (a$_3$) or (b); even more preferably, it is $D_4$, where $D_4$ is a radical (a$_4$); most preferably, D is $D_5$, where $D_5$ is a radical of formula (a$_5$).

Any alkyl as $R_5$ may be straight chain or branched; preferably, the alkyl group is linear. More preferably, any alkyl as $R_5$ contains 1 or 2 carbon atoms; most preferably, it is methyl. Any substituted alkyl group as $R_5$ preferably contains 2 or 3 carbon atoms, where the substituent is in the 2- or 3-position; more preferably, it is an ethyl group with the substituent in the 2-position; most preferably, it is 2-hydroxyethyl.

$R_5$ is preferably $R_{5a}$, where $R_{5a}$ is a linear $C_{1-4}$alkyl group or a $C_{2-3}$alkyl group monosubstituted by chloro, cyano or hydroxy and containing the substituent on the $C_2$- or $C_3$-atom. More preferably, it is $R_{5b}$, where $R_{5b}$ is methyl, ethyl or 2-hydroxyethyl; even more preferably, it is $R_{5c}$, where $R_{5c}$ is methyl or ethyl; most preferably, $R_5$ is methyl.

Any alkyl or alkoxy as $R_6$ preferably contains 1 or 2 carbon atoms; most preferably, it is methyl and methoxy, respectively.

$R_6$ is preferably $R_{6a}$, where $r_{6a}$ is chlorine, $C_{1-2}$alkyl or $C_{1-2}$alkoxy. More preferably, $R_6$ is $R_{6b}$, where $R_{6b}$ is methyl or ethyl. Especially, $R_6$ is methyl.

The radical (c) is preferably (c$_1$), where (c$_1$) is a radical (c) in which $R_5$ is $R_{5a}$ and $R_6$ is $R_{6a}$. More preferably, it is (c$_2$), where (c$_2$) is a radical (c) in which $R_5$ is $R_{5b}$ and $R_6$ is $R_{6b}$. Even more preferably, it is (c$_3$), where (c$_3$) is a radical (c) in which $R_5$ is $R_{5c}$ and $R_6$ is $R_{6b}$. Most preferably, it is (c$_4$), where (c$_4$) is a radical (c) in which $R_5$ and $R_6$ are both methyl.

Y is preferably $Y_1$, where $Y_1$ is a group —NR$_3$R$_4$ or a radical (c$_1$). More preferably, it is $Y_2$, where $Y_2$ is a group —NR$_3$R$_4$ or a radical (c$_2$). Even more preferably, it is $Y_3$, where $Y_3$ is a radical (c$_3$). Most preferably, it is $Y_4$, where $Y_4$ is a radical (c$_4$).

Preferred compounds correspond, in the free acid form, to formula Ia;

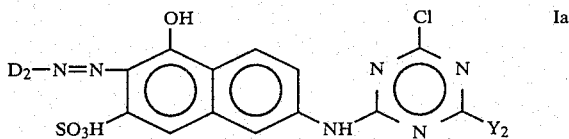

further preferred compounds of formula Ia are those wherein
(1) $D_2$ is $D_3$;
(2) $Y_2$ is $Y_3$;
(3) those of (1) or (2), wherein $D_2$ is $D_4$;
(4) the compound of group (3), wherein $D_2$ is $D_5$ and $Y_2$ is $Y_4$.

The cations of the sulpho groups when the compounds of formula I are in salt form are not critical and may be any of those nonchromophoric cations common in the field of reactive dyestuffs. Generally, in a compound of formula I the cations of the sulpho groups may be the same or different, e.g., the compound may be in a mixed salt form.

Examples of suitable cations are alkali metal cations and unsubstituted or substituted ammonium ions, such as lithium, sodium, potassium, ammonium, mono-, di-, tri- and tetra-methylammonium, triethylammonium and mono-, di- and tri-ethanolammonium.

The preferred cations are the alkali metal cations and ammonium, with sodium being the most preferred.

The present invention further provides a process for the preparation of the compounds of formula I comprising reacting the following components:
a diazotized amine D-NH$_2$,
a coupling component of formula II,

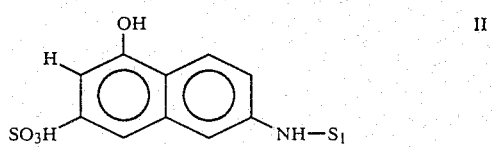

in which $S_1$ is hydrogen or a conventional protecting group which is to be split off before any condensation reaction,
cyanuric chloride, and
an amine Y-H
which components must be present in the corresponding stoichiometric molar ratio to obtain a compound of formula I—by coupling and condensing in any desired order.

It is preferred to prepare the compounds of formula I by reacting a compound of formula III,

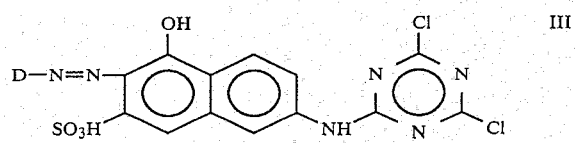

with an amine Y-H.

A further preferred process variant is the preparation of the compounds of formula I by coupling with diazotized amine D-NH$_2$ with a compound of formula IV

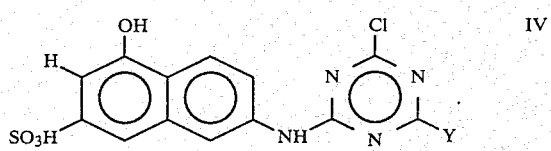

This process variant is insofar favoured as the preparation of the starting materials of formula IV and the subsequent coupling reaction may be carried out in a one step reaction without any isolation of intermediates.

Diazotization and coupling reactions may be effected in conventional manner. Preferably, coupling is carried out in a weakly acid to neutral reaction medium and at temperatures of 0°–30° C.

Any protecting group $S_1$ is preferably split off by alkaline hydrolysis at 80°–100° C.

The replacement of the chlorine atoms in cyanuric chloride by separate condensation steps may be effected in conventional manner. Preferably, the replacement of a chlorine atom by the radical Y may be carried out as second condensation step, usually at 40°–65° C., especially at 50°–60° C., and employing a reaction medium of weakly acid pH.

The compounds of formula I may be isolated in accordance with known methods, for example, by conventional salting out with alkali metal salt, filtering and drying in a vacuo. Depending on the reaction- and isolation-conditions, a compound of formula I is obtained in free acid or preferably salt form or even mixed salt forms containing, for example, one or more of the above mentioned cations. It may be converted from free acid form to a salt form or mixture of salt forms or vice versa or from one salt form to another by conventional means.

The starting materials, the amino compounds D-NH$_2$ or Y-H, are either known or may be prepared in accordance with known methods from available starting materials.

The compounds of formula I and mixtures thereof which are preferably in salt form, are useful as reactive dyestuffs for dyeing or printing hydroxy group- or nitrogen-containing organic substrates. Preferred substrates are leather and textiles containing or consisting of natural or synthetic polyamides such as wool, silk and nylon, natural or regenerated cellulose such as cotton, viscose and spun rayon. The most preferred substrate is textile material containing or consisting of cotton.

Dyeing or printing is effected in accordance with known methods. Since the compounds of formula I exhaust well from the dyebath they are suitable for all conventional dyeing processes using the exhaust dyeing method. They may be applied according to conventional methods per se or in combination with appropriate other fibre-reactive dyestuffs having analogous dyeing properties and, since they are well compatible, also in important three component dye mixtures. The dyeings obtained with such combination mixtures have good fastness properties and do not show catalytic fading.

Surprisingly, the reactivity of the compounds of formula I to the substrate is not temperature dependent in the usual dyeing temperature ranges. Therefore, dyeing may be effected equally well at 100° C. as at 80° C. without any loss of fixation yield, even in some cases the fixation yield will be increased at 100° C. Evidently, the dyestuffs of the present invention are hydrolysis resistant at high temperatures and passing over the dyeing temperature will not be critical to the fixation yield.

A dyeing temperature of about 100° C. may be advantageously applied since dyestuffs migrate better at high temperatures and thus giving more even dyeings.

Furthermore, the compounds of this invention are notably well soluble in water, even in electrolyte-containing dyeing liquors. The dyeings obtained with the compounds of formula I are brilliant and show good light fastness and wet fastness properties, e.g., wash-, water- and sweat-fastnesses are perfect. Further, they have good fastness to chlorinated water and to peroxide and perborate-containing wash liquors; they are also fast to hypochlorite bleaching.

The following examples further serve to illustrate the invention. In the examples all parts and percentages are by weight or volume and the temperatures are in degrees Centigrade.

EXAMPLE 1

20.3 Parts 2-amino-5-methoxybenzenesulphonic acid are dissolved in 200 parts water and 25 parts 30% hydrochloric acid are added. Diazotization is effected by 6.9 parts sodium nitrite dissolved in 24 parts water at 0°–2° during 20 minutes. The thus obtained diazotized compound is added to 30.3 parts 2-acetamido-5-hydroxynaphthalene-7-sulphonic acid in the sodium salt form dissolved in 200 parts water at 30°–35°. During coupling the pH of the reaction mixture is maintained at 6.5 to 7.0 by the addition of sodium carbonate solution, and the temperature is kept at 10°–20°. When the coupling reaction is completed, 30 parts sodium hydroxide solution are added. Stirring is effected during one hour at 90°–95° to split off the acetyl group. Subsequently, the aminoazo dyestuff is salted out with sodium chloride and filtered.

The obtained paste is dissolved in 600 parts water. The solution is adjusted to pH 6 by the addition of hydrochloric acid. To this reaction mixture 14.75 parts cyanuric chloride are added portionwise at 20°–25° and stirring is continued for further two hours at this temperature. Simultaneously, the pH is kept at 6.0–6.5 by the addition of dilute sodium carbonate solution. After the condensation has been finished, 9.7 parts N-methylamino-2-methylbenzene are added. The mixture is stirred for 30 minutes at 50°–55° whilst maintaining the pH at 6.0–6.5 by the addition of dilute sodium carbonate solution. When the condensation is completed, the product is salted out with sodium chloride and filtered. After drying, the dyestuff which, in the free acid form, corresponds to the formula

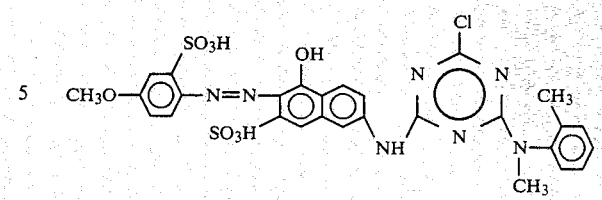

is obtained as a dark red powder, which dissolves in water with red colour. This dyestuff, which shows excellent resistance to electrolytes, dyes cotton in scarlet shades. The cotton dyeings have good light fastness and wet fastness properties.

In analogy with the method described in Example 1 but using the corresponding starting materials, further compounds of formula I may be prepared which are listed in the following Tables 1 and 2. They correspond, in the free acid form, to formula V

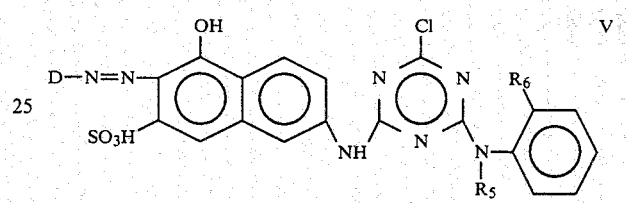

for Table 1; and to formula VI

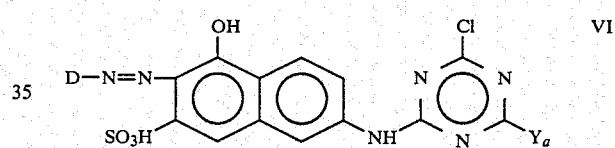

for Table 2.

Substrates containing or consisting of cellulose fibres and particularly those containing or consisting of cotton may be dyed with these dyestuffs in accordance with the conventional exhaust dyeing method. In the last column I of the Tables 1 and 2, the shade of the dyeing on cotton is given, whereby a is orange;

b is reddish orange; and c is scarlet.

The dyeings obtained show good light fastness and wet fastness properties.

TABLE 1

| | formula V | | | |
|---|---|---|---|---|
| Ex. No. | D | $R_5$ | $R_6$ | I |
| 2 | CH₃O—⟨⟩— with SO₃H | $C_2H_5$ | $CH_3$ | c |
| 3 | " | " | $C_2H_5$ | c |
| 4 | " | n-Butyl | $CH_3$ | c |
| 5 | " | $CH_3$ | $C_2H_5$ | c |
| 6 | " | " | Cl | c |
| 7 | " | " | $OCH_3$ | c |
| 8 | " | $CH_2CH_2OH$ | $CH_3$ | c |
| 9 | H₃C—⟨⟩— with SO₃H | $CH_3$ | " | a |

TABLE 1-continued formula V

| Ex. No. | D | $R_5$ | $R_6$ | I |
|---|---|---|---|---|
| 10 | " | $C_2H_5$ | " | a |
| 11 | " | " | $C_2H_5$ | a |
| 12 | " | $CH_3$ | " | a |
| 13 | 2-SO₃H-phenyl | " | " | a |
| 14 | " | " | $CH_3$ | a |
| 15 | " | $C_2H_5$ | " | a |
| 16 | " | " | $C_2H_5$ | a |
| 17 | " | $CH_2CH_2OH$ | $CH_3$ | a |
| 18 | " | $C_2H_5$ | n-Butyl | a |
| 19 | " | $CH_3$ | Cl | a |
| 20 | " | " | $OCH_3$ | a |
| 21 | 2-SO₃H-4-CH₃O-5-SO₃H-phenyl | " | $CH_3$ | b |
| 22 | " | $C_2H_5$ | " | b |
| 23 | " | " | $C_2H_5$ | b |
| 24 | " | $CH_3$ | " | b |
| 25 | 2-SO₃H-4-CH₃-5-SO₃H-phenyl | " | $CH_3$ | b |
| 26 | " | $C_2H_5$ | " | b |
| 27 | " | " | $C_2H_5$ | b |
| 28 | 2-SO₃H-5-CH₃CONH-phenyl | $CH_3$ | $CH_3$ | a |
| 29 | " | " | $C_2H_5$ | a |
| 30 | " | " | $C_2H_5$ | a |
| 31 | " | " | Cl | a |
| 32 | 1,5-disulfo-naphth-2-yl | " | $C_2H_5$ | b |
| 33 | " | $CH_3$ | " | b |
| 34 | " | " | $CH_3$ | b |
| 35 | " | " | n-Butyl | b |
| 36 | " | $C_2H_5$ | $CH_3$ | b |

TABLE 2 formula VI

| Ex. No. | D | $Y_a$ | I |
|---|---|---|---|
| 37 | 2-SO₃H-4-CH₃O-phenyl | —NHCH₂CH(OH)CH₂OH | c |
| 38 | " | —N(CH₂CH(OH)CH₂OH)₂ | c |
| 39 | " | { —NHCH₂CH(OH)CH₂OH and —N(CH₂CH(OH)CH₂OH)₂ } | c |
| 40 | 2-SO₃H-4-CH₃O-5-SO₃H-phenyl | " | b |
| 41 | 2-SO₃H-phenyl | " | a |
| 42 | 1,5-disulfo-naphth-2-yl | " | b |
| 43 | " | —NHCH₂CH(OH)CH₂OH | b |
| 44 | " | —NH(CH₂CH(OH)CH₂OH)₂ | b |
| 45 | 2-SO₃H-phenyl | " | a |
| 46 | " | —NHCH₂CH(OH)CH₂OH | a |

In accordance with the method as described the dyestuffs of Examples 1 to 46 are obtained in the sodium salt form. They may, depending on the reaction-/isolation-conditions or by reacting the sodium salts in accordance with known methods, also be obtained in free acid form or in other salt forms, for example those salt forms containing one or more cations indicated in the description hereinbefore.

In the following examples the application of the dyestuffs of this invention is illustrated.

APPLICATION EXAMPLE A

To a dyebath consisting of 1000 parts water, 20 parts Glauber's salt (calcinated), 2.5 parts sodium carbonate (calcinated) and 1 part of the sodium salt of 1-nitrobenzene-3-sulphonic acid, 50 parts mercerized cotton fabric are added. The bath is heated to 40°, then 1 part of the dye of Example 1 or 39 is added. The temperature is raised to 98° within 45 minutes; during this time 20 parts Glauber's salt (calcinated) are added after 15 minutes and again 20 parts Glauber's salt (calcinated) are added after further 15 minutes. At the end of this time 7.5 parts sodium carbonate (calcinated) are added. Dyeing is continued at the boil for 45 to 60 minutes. Subsequently, the dyed fabric is rinsed hot and soaped at the boil for 20 minutes in 500 parts water and 0.5 parts sodium alkyl-sulphonate. After rinsing and drying in both cases a scarlet cotton dyeing with good fastness properties is obtained.

APPLICATION EXAMPLE B

To a dyebath consisting of 1000 parts water, 60 parts Glauber's salt (calcinated), 15 parts sodium carbonate (calcinated) and 1 part of the sodium salt of 1-nitrobenzene-3-sulphonic acid, 50 parts of cotton fabric are added. The bath is heated to 60°. Subsequently, 1.5 parts of the dye of Example 1 are added. The temperature is kept at 60° for 15 minutes and is then raised to 98° within 30 minutes. Dyeing is continued for 45–60 minutes at 98°. The dyed fabric is rinsed hot and soaped according to the method given in Application Example A. After rinsing and drying a scarlet cotton dyeing is obtained having good fastness properties.

APPLICATION EXAMPLE C

1 Part of the dyestuff of Example 1 or 39 is dissolved in 2000 parts water. 100 Parts cotton fabric are added and the temperature of the dyebath is raised to 80° within 10 minutes. 100 Parts Glauber's salt (calcinated) are added and 30 minutes thereafter, 20 parts sodium carbonate (calcinated). Dyeing is continued for one hour at 80°. Subsequently, the dyed fabric is rinsed cold, then hot, and is soaped according to the method given for Application Example A. After rinsing and drying in both cases a scarlet cotton dyeing is obtained having good fastness properties.

Similarly, the dyes or mixtures of Example 2 to 38 and 40 to 46 may be employed to dye cotton in accordance with the method given for Application Example A, B or C.

What is claimed is:

1. A compound of the formula

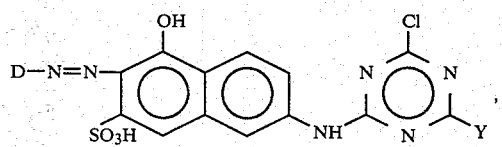

or a salt thereof each cation of which is independently a non-chromophoric cation,
wherein
D is

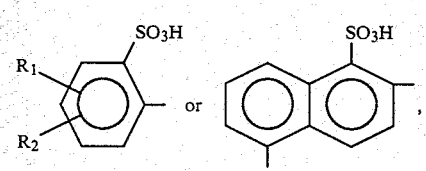

wherein
$R_1$ is hydrogen or sulfo, and
$R_2$ is hydrogen, halo, methyl, methoxy or acetamido, and
Y is

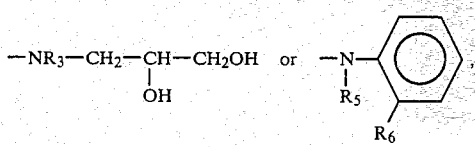

wherein
$R_3$ is hydrogen or

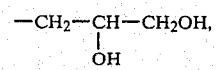

$R_5$ is $C_{1-4}$alkyl or $C_{1-4}$alkyl monosubstituted by chloro, cyano or hydroxy, and
$R_6$ is halo, $C_{1-4}$alkyl or $C_{1-4}$alkoxy,
or a mixture of such compounds in free acid or salt form each cation of which is independently a non-chromophoric cation.

2. A compound according to claim 1, or a salt thereof each cation of which is independently a non-chromophoric cation.

3. A compound according to claim 2, or a salt thereof each cation of which is independently a non-chromophoric cation, wherein
$R_2$ is hydrogen, chloro, methyl, methoxy or acetamido.

4. A compound according to claim 3, or a salt thereof each cation of which is independently a non-chromophoric cation, wherein
$R_5$ is $C_{1-4}$alkyl or $C_{2-3}$alkyl monosubstituted in the 2- or 3-position by chloro, cyano or hydroxy.

5. A compound according to claim 4, or a salt thereof each cation of which is independently lithium, sodium, potassium, ammonium, methylammonium, dimethylammonium, trimethylammonium, tetramethylammonium, triethylammonium, ethanolammonium, diethanolammonium or triethanolammonium.

6. A compound according to claim 3, or a salt thereof each cation of which is independently a non-chromophoric cation, wherein
D is

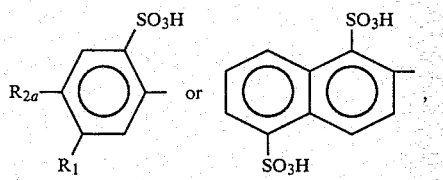

wherein
$R_1$ is hydrogen or sulfo, and
$R_{2a}$ is hydrogen, chloro, methyl, methoxy or acetamido.

7. A compound according to claim 6, or a salt thereof each cation of which is independently a non-chromophoric cation, wherein
$R_{2a}$ is hydrogen, methyl or methoxy.

8. A compound according to claim 7, or a salt thereof each cation of which is independently a non-chromophoric cation, wherein
D is

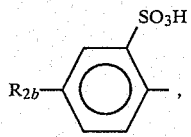

wherein
R$_{2b}$ is hydrogen, methyl or methoxy.

9. A compound according to claim 8, or a salt thereof each cation of which is independently a non-chromophoric cation, wherein
R$_{2b}$ is methoxy.

10. A compound according to claim 2, or a salt thereof each cation of which is independently a non-chromophoric cation, wherein
R$_5$ is methyl, ethyl or 2-hydroxyethyl, and
R$_6$ is methyl or ethyl.

11. A compound according to claim 10, or a salt thereof each cation of which is independently a non-chromophoric cation, wherein
Y is

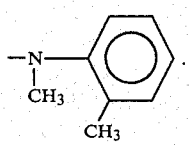

12. A compound according to claim 10 having the formula

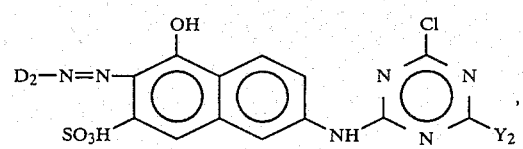

or a salt thereof each cation of which is independently a non-chromophoric cation, wherein
D$_2$ is

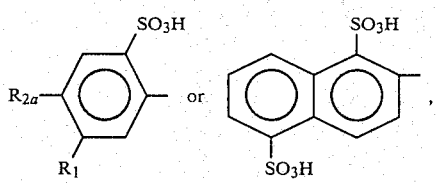

wherein
R$_1$ is hydrogen or sulfo, and
R$_{2a}$ is hydrogen, chloro, methyl, methoxy or acetamido, and
Y$_2$ is

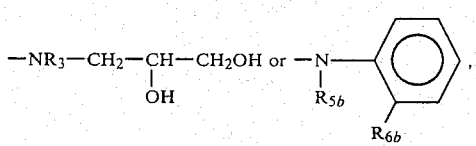

wherein
R$_3$ is hydrogen or

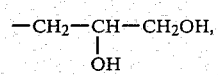

R$_{5b}$ is methyl, ethyl or 2-hydroxyethyl, and
R$_{6b}$ is methyl or ethyl.

13. A compound according to claim 12, or a salt thereof each cation of which is independently a non-chromophoric cation, wherein
R$_{2a}$ is hydrogen, methyl or methoxy.

14. A compound according to claim 13, or a salt thereof each cation of which is independently a non-chromophoric cation, wherein
D$_2$ is

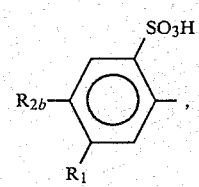

wherein
R$_1$ is hydrogen or sulfo, and
R$_{2b}$ is hydrogen, methyl or methoxy, and
Y$_2$ is

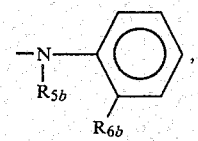

wherein
R$_{5b}$ is methyl, ethyl or 2-hydroxyethyl, and
R$_{6b}$ is methyl or ethyl.

15. A compound according to claim 12, or a salt thereof each cation of which is independently a non-chromophoric cation, wherein
Y$_2$ is

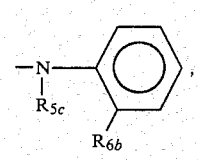

wherein
R$_{5c}$ is methyl or ethyl, and
R$_{6b}$ is methyl or ethyl.

16. A compound according to claim 15, or a salt thereof each cation of which is independently a non-chromophoric cation, wherein
D$_2$ is

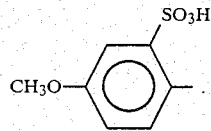

17. The compound according to claim 16 having the formula

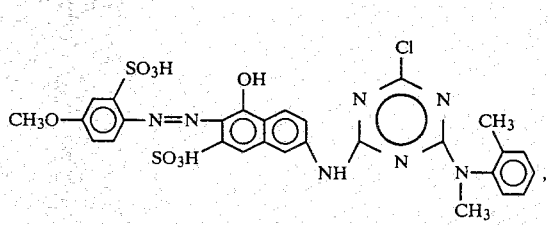

or a salt thereof each cation of which is independently a non-chromophoric cation.

18. The compound according to claim 17 in sodium salt form.

19. A process for dyeing or printing an hydroxy-group or nitrogen-containing organic substrate comprising applying a compound according to claim 1, or a salt thereof each cation of which is independently a non-chromophoric cation, or a mixture of such compounds in free acid or salt form each cation of which is independently a non-chromophoric cation, as a dyeing or printing agent, to an hydroxy group- or nitrogen-containing organic substrate, said nitrogen-containing organic substrate being selected from the group consisting of leather, natural polyamide and synthetic polyamide.

20. A process according to claim 19, wherein the organic substrate is a textile containing or consisting of cotton.

* * * * *